United States Patent
Chai

(10) Patent No.: US 9,647,848 B2
(45) Date of Patent: *May 9, 2017

(54) APPLICATION CHARGING METHOD, DEVICE, AND SYSTEM

(71) Applicant: HUAWEI TECHNOLOGIES CO., LTD., Shenzhen, Guangdong (CN)

(72) Inventor: Xiaoqian Chai, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/137,219

(22) Filed: Apr. 25, 2016

(65) Prior Publication Data

US 2016/0241407 A1    Aug. 18, 2016

Related U.S. Application Data

(63) Continuation of application No. 14/880,476, filed on Oct. 12, 2015, now Pat. No. 9,331,857, which is a
(Continued)

(51) Int. Cl.
*H04L 12/14* (2006.01)
*H04L 12/26* (2006.01)
(Continued)

(52) U.S. Cl.
CPC ...... *H04L 12/1407* (2013.01); *H04L 12/1485* (2013.01); *H04L 43/028* (2013.01);
(Continued)

(58) Field of Classification Search
CPC ..... H04L 12/1403; H04W 4/24; H04M 15/60; H04M 15/64; H04M 15/66; H04M 15/67
See application file for complete search history.

(56) References Cited

U.S. PATENT DOCUMENTS 9,331,857 B2 * 5/2016 Chai ............... H04L 43/028
2008/0046963 A1   2/2008 Grayson et al.
(Continued)

FOREIGN PATENT DOCUMENTS

CN    101132405 A    2/2008
CN    101325780 A    12/2008
(Continued)

OTHER PUBLICATIONS

XP050363015. "3rd Generation Partnership Project; Technical Specification Group Services and System Aspects; Policy and charging control architecture (Release 7)", 3GPP Standard; 3GPP TS 23.203, V7.6.0, Mar. 1, 2008, total 72 pages.
(Continued)

*Primary Examiner* — Benjamin H Elliott, IV
(74) *Attorney, Agent, or Firm* — Huawei Technologies Co., Ltd.

(57) ABSTRACT

The present invention discloses an application charging method. The method includes receiving, by a CTF device, a charging rule of an application from a PCRF device, wherein the charging rule of the application carries an application identifier and charging rule parameters of the application, executing the charging rule of the application, and detecting, according to an application identifier, a flow of the application transmitted on one or more bearers, sending, by the CTF device according to charging rule parameters of the application, a charging session establishment request to a charging system and establishing a charging session of the application, collecting charging information about the detected flow of the application, and sending the collected charging information about the flow of the application to the charging system by using the charging session of the application.

18 Claims, 6 Drawing Sheets

Related U.S. Application Data continuation of application No. PCT/CN2013/074642, filed on Apr. 24, 2013.

(51) Int. Cl.
  *H04M 15/00* (2006.01)
  *H04L 29/08* (2006.01)

(52) U.S. Cl.
  CPC ............ *H04L 67/14* (2013.01); *H04M 15/61* (2013.01); *H04M 15/64* (2013.01); *H04M 15/66* (2013.01); *H04M 15/8228* (2013.01)

(56) References Cited

U.S. PATENT DOCUMENTS

| | | | |
|---|---|---|---|
| 2008/0229385 | A1 | 9/2008 | Feder et al. |
| 2009/0193131 | A1 | 7/2009 | Shi |
| 2009/0264097 | A1 | 10/2009 | Cai |
| 2010/0043053 | A1 | 2/2010 | Wei |
| 2011/0066530 | A1 | 3/2011 | Cai et al. |
| 2012/0290452 | A1 | 11/2012 | Pancorbo Marcos et al. |
| 2013/0262308 | A1 | 10/2013 | Cai et al. |
| 2014/0376412 | A1 | 12/2014 | Li |
| 2015/0156334 | A1 | 6/2015 | Chai |
| 2015/0207636 | A1 | 7/2015 | Qiao et al. |
| 2016/0241407 | A1* | 8/2016 | Chai ................ H04L 43/028 |

FOREIGN PATENT DOCUMENTS

| | | |
|---|---|---|
| JP | 2010517475 A | 5/2010 |
| WO | 2011139617 A1 | 11/2011 |
| WO | 2012077073 A1 | 6/2012 |

OTHER PUBLICATIONS

XP050374674. "3rd Generation Partnership Project; Technical Specification Group Service and System Aspects; Teleconiniunication management; Charging management; Diameter charging applications (Release 8)", 3GPP Standard; 3GPP TS 32.299, No. V8.8.0, Sep. 1, 2009, total 142 pges.

3GPP TS 29.061 V10.9.0, 3rd Generation Partnership Project;Technical Specification Group Core Network and Terminals; Interworking between the Public Land Mobile Network (PLMN) supporting packet based services and Packet Data Networks (PDN) (Release 10), Mar. 2013, total 159 pages.

3GPP TS 23.203 V11.9.0, 3rd Generation Partnership Project; Technical Specification Group Services and System Aspects; Policy and charging control architecture (Release 11), Mar. 2013, total 181 pages.

3GPP TS 29.212 V12.0.0, 3rd Generation Partnership Project;Technical Specification Group Core Network and Terminals; Policy and Charging Control (PCC); Reference points (Release 12), Mar. 2013, total 198 pages.

3GPP TS 32.251 V12.1.0, 3rd Generation Partnership Project;Technical Specification Group Services and System Aspects;Telecommunication management;Charging management;Packet Switched (PS) domain charging (Release 12) Mar. 2013, total 94 pages.

XP050691770,"3rd generation partnership project; techinical specification group service and system aspects; study on application based charging; stage 2 (release 12)", 3GPP TR23.800. V.1.1.0. Feb. 12, 2013 total 61 pages.

* cited by examiner

APPLICATION CHARGING METHOD, DEVICE, AND SYSTEM

CROSS-REFERENCE TO RELATED APPLICATIONS

This application is a continuation of U.S. patent application Ser. No. 14/880,476, filed on Oct. 12, 2015, now allowed, which is a continuation of International Application No. PCT/CN2013/074642, filed on Apr. 24, 2013, both of which are hereby incorporated by reference in their entireties

TECHNICAL FIELD

The present invention relates to the field of communications technologies, and in particular, to an application charging method, charging device, and system.

BACKGROUND

Large-scale deployment of 3G networks greatly drives use of data services. Quick development of OTT (Over The Top, Internet service) services makes operators gradually channelized. To improve accurate charging and control for network traffic of operators, improve user experience, and increase the value of unit traffic, charging and control for an OTT application has become an important technical means.

PCC (Policy and Charging Control, policy and charging control) is a policy and charging control mechanism defined by the 3GPP (3rd Generation Partnership Project, 3rd Generation Partnership Project), and an architecture of PCC is shown in FIG. 1. The architecture includes a policy and charging enforcement function (PCEF device, Policy and Charging Enforcement Function), a traffic detection function (TDF, Traffic Detection Function), a bearer binding and event reporting function (BBERF, Bearer Binding and Event Reporting Function), a policy and charging rules function (PCRF device, Policy and Charging Rules Function), an application function (AF, Application Function), an online charging system (OCS, Online Charging System), an offline charging system (OFCS, Offline Charging System), and a subscription profile repository (SPR, Subscription Profile Repository). The architecture includes interfaces such as Gx, Sy, Gy, and Ro interfaces, where the Gx is an interface between the PCRF and the PCEF, the Sy is an interface between the PCRF and the OCS, the Gy is an interface between the PCEF and the OCS, and the Ro is a collective name of online charging interfaces between network elements and the OCS. The PCEF device is a policy and charging enforcement entity and is used to execute a dynamic or static control policy and may be located in a gateway device such as a GGSN and a P-GW or placed behind a gateway device. The TDF is an application detection and control entity and is used to execute an application detection and control policy delivered by the PCRF device. The PCRF device is a policy and charging rules function entity in charge of controlling the QoS, bandwidth, gating, a charging policy, and so on when a user equipment uses a service in a home network. The SPR is a subscription data storage entity, and is used to store subscription data of a user and map the data to an existing system. The SPR may be an HLR, an HSS, an OCS, or other entities. In the mechanism, the PCRF entity performs policy generation (Policy Decision) to generate a data flow charging and control policy for the PCEF entity and an application detection and application control policy for the TDF entity. Then the PCRF entity installs and activates an application control policy for the TDF entity and installs a flow control and charging policy for the PCEF entity. According to a data flow charging policy delivered by the PCRF entity, the PCEF entity initiates a data flow credit quota request, namely, a credit control request (Credit Control Request, CCR) message, to the OCS (where if a bearer is to be established, the PCEF entity initiates a charging session establishment request to the OCS). The OCS grants the quota and returns the granted quota to the PCEF entity.

In this mechanism, a charging policy delivered by the PCRF to the PCEF includes charging rule parameters of a service data flow (SDF, Service Data Flow), specifically including: online or offline charging, rating group (Rating Group), report level (Report Level), traffic-, duration- or event-based charging, and so on.

When executing a charging policy delivered by the PCRF, the PCEF establishes a charging session with the OCS. The specific manner of establishing a charging session is as follows:

For a general packet radio service (General Packet Radio Service, GPRS), the PCEF establishes a charging session for each Packet Data Protocol (Packet Data Protocol, PDP) context (PDP Context). The PCEF establishes a charging session when a PDP Context starts, and terminates the charging session when the PDP Context ends or when the OCS initiates session termination.

For an evolved packet core (Evolved Packet Core, EPC), if an S5 interface is based on the GPRS Tunneling Protocol (GPRS tunneling protocol, GTP), the PCEF establishes a charging session for each IP connectivity access network bearer (IP-CAN Bearer). The PCEF establishes a charging session when an IP-CAN Bearer starts, and terminates the charging session when the IP-CAN bearer ends or when the OCS initiates session termination.

For the EPC, if the S5 interface is based on the Proxy Mobile IP Protocol (Proxy Mobile IP Protocol, PMIP), the PCEF establishes a charging session for an IP connectivity access network session (IP-CAN Session). The charging session is regarded as a charging session on an IP-CAN Bearer and transmits a parameter of the IP-CAN Bearer.

The existing charging is based on the IP-CAN Bearer. The parameter (carried in a PS-information parameter) of the IP-CAN Bearer is reported to the OCS. In addition, charging information collected with a rating group or rating group+ service ID as a granularity is reported.

Based on the existing charging mechanism, a prerequisite for charging for an application is that the PCRF knows the flow description of the application, namely, an IP quintuple, and that flows of the application are on a same bearer. The PCRF delivers a charging policy of the application flow on a bearer to the PCEF, and the PCEF performs IP layer parsing on an IP packet, that is, packet parsing of L3/4 layer according to service data flow (SDF, Service Data Flow) information in the charging policy, and further collects charging information about the application flow on a unified basis and reports the information to a charging system under certain conditions, so as to implement charging for the application. In this charging mode, because the PCRF knows the IP quintuple attribute of an application packet in advance and binds the application flow to a bearer, charging for the application can be implemented in an existing charging mode based on an IP-CAN Bearer.

The following technical problems exist during implementation of the existing technical solution:

1) It is difficult to ensure that a flow of an application is transmitted on one bearer, so that an existing charging session based on a granularity of a bearer can transmit only charging information about this bearer and the requirement for application-based charging for a cross-bearer OTT application cannot be met.

2) When the TDF detects an application, if a feature of the application flow cannot be described using a quintuple or the quintuple attribute of the application flow changes frequently, which causes the PCRF and the PCEF to make change frequently and results in low system availability, it is difficult to implement charging for an OTT application.

SUMMARY

Embodiments of the present invention provide an application charging method, charging device, and system, which can implement application-based charging for an OTT application.

According to a first aspect, an embodiment of the present invention provides an application charging method, including: receiving, by a charging detection function CTF device, a charging rule of an application from a policy and charging rules function PCRF device, where the charging rule of the application carries an application identifier and charging rule parameters of the application; executing, by the CTF device, the charging rule of the application, and detecting, according to the application identifier, a flow of the application transmitted on one or more bearers; sending, by the CTF device according to the charging rule parameters of the application, a charging session establishment request to a charging system, and establishing a charging session of the application by using the charging session establishment request; collecting, by the CTF device, charging information about the flow of the detected application; and sending, by the CTF device, the collected charging information about the flow of the application to the charging system by using the charging session of the application.

In a first implementation manner of the first aspect, the CTF device is a PCEF device, and the sending, by the CTF device according to the charging rule parameters of the application, a charging session establishment request to a charging system, and establishing a charging session of the application by using the charging session establishment request, specifically includes: when the charging session of the application is a charging session of a default bearer, and the charging session of the default bearer is capable of reporting the charging information about the flow of the application transmitted on one or more bearers, if the CTF device has established the charging session of the default bearer with the charging system, reusing the charging session, or otherwise, sending, by the CTF device, a charging session establishment request to the charging system.

With reference to the first aspect and the first implementation manner of the first aspect, in a second implementation manner of the first aspect, the sending, by the CTF device according to the charging rule parameters of the application, a charging session establishment request to the charging system, and establishing a charging session of the application by using the charging session establishment request, specifically includes: when the CTF device detects a first application to be charged, sending, by the CTF device according to the charging rule parameters, a charging session establishment request to the charging system, and establishing the charging session of the application by using the charging session establishment request.

With reference to the second implementation manner of the first aspect, in a third implementation manner of the first aspect, the detecting, by the CTF device, a first application to be charged, specifically includes: detecting, by the CTF device according to the application identifier, the flow of the application corresponding to the application identifier, and determining, according to the charging rule of the application, that the charging information about the detected application needs to be collected and reported, and if no charging session of the application exists currently, determining, by the CTF device, that the detected application is the first application to be charged.

With reference to the first aspect and the first to third implementation manners of the first aspect, in a fourth implementation manner of the first aspect, the method further includes: receiving, by the CTF device, charging rules of other applications from the PCRF device, and detecting, according to the charging rules of the other applications, flows of the other applications transmitted on one or more bearers; and the determining, according to the received charging rule of the application, that the charging information about the detected application needs to be collected and reported, specifically includes: when the CTF device detects that the flow of the application matches charging rules of multiple applications, if a charging priority of the charging rule of the application corresponding to the application identifier is higher than charging priorities of the charging rules of the other applications and the charging rule of the application corresponding to the application identifier indicates a need of charging for the application, determining, by the CTF device, that the charging information about the application corresponding to the application identifier needs to be collected and reported; or the method further includes: receiving, by the CTF device, charging rules of other applications from the PCRF device, and detecting, according to the charging rules of the other applications, flows of the other applications transmitted on one or more bearers; and if the CTF device receives a charging rule of a flow from the PCRF device, the determining, according to the received charging rule of the application, that the charging information about the detected application needs to be collected and reported, specifically includes: when the flow of the detected application matches the charging rule of the flow and charging rules of multiple applications, if a charging priority of the charging rule of the application corresponding to the application identifier is higher than a charging priority of the charging rule of the flow and charging priorities of the charging rules of the other applications and the charging rule of the application corresponding to the application identifier indicates a need of charging for the application, determining, by the CTF device, that the charging information about the application corresponding to the application identifier needs to be collected and reported.

With reference to the first to fourth implementation manners of the first aspect, in a fifth implementation manner of the first aspect, after the charging session of the application is established, the method further includes: if the charging system is an online charging system, when the CTF device detects that other applications to be charged start, and no quota meeting rating groups of the other applications is provided currently, requesting, by the CTF device, quotas of the other applications from the charging system by using the established charging session of the application; or if the CTF device detects that the charged application ends, and the charging rule of the charging-ended application indicates reporting of application-layer charging information about the charging-ended application, sending, by the CTF device, the collected charging information about the charging-ended application to the charging system by using the established charging session of the application.

With reference to the first to fifth implementation manners of the first aspect, in a sixth implementation manner of the first aspect, the charging method further includes: when the CTF device detects that a last charged application ends, sending, by the CTF device, a charging session termination request to the charging system to terminate the established charging session of the application.

With reference to the sixth implementation manner of the first aspect, in a seventh implementation manner of the first aspect, the detecting, by the CTF device, that a last charged application ends, specifically includes: if the application corresponding to the application identifier ends and no other applications are collecting or reporting charging information currently, or the charging rule of the application corresponding to the application identifier is updated or deleted, resulting in no need to perform charging for the application and no other applications are collecting or reporting charging information currently, determining, by the CTF device, that the detected last charged application ends.

With reference to the sixth and seventh implementation manners of the first aspect, in an eighth implementation manner, when the CTF device detects that the last charged application ends, if an IP connectivity access network session IP-CAN session does not end, the charging session termination request includes an indication for indicating that charging for the last application ends but the IP-CAN session does not end; and if the IP-CAN session ends, the charging session termination request includes an indication for indicating that the IP-CAN session ends.

With reference to the first aspect and the first to eighth implementation manners of the first aspect, in a ninth implementation manner of the first aspect, the CTF device sends an address of a serving gateway that the flow of the application passes through or an identifier of a public land mobile network PLMN to the charging system by using the charging session of the application, so that the charging system charges for the application corresponding to the application identifier according to the serving gateway address or PLMN identifier.

With reference to the ninth implementation manner of the first aspect, in a tenth implementation manner of the first aspect, the CTF device is a traffic detection function TDF device, and the method further includes: receiving, by the TDF device, the serving gateway address or PLMN identifier sent by the PCRF device, where the serving gateway address or PLMN identifier is sent by the PCEF device to the PCRF device.

With reference to the tenth implementation manner of the first aspect, in an eleventh implementation manner of the first aspect, the method further includes: sending, by the CTF device, a serving gateway address change subscription request or PLMN change subscription request to the PCRF device, whereupon the PCRF device sends the serving gateway address change subscription request or PLMN change subscription request to the PCEF device according to the serving gateway address change subscription request or PLMN change subscription request sent by the CTF device, so that the PCEF device sends the serving gateway address or PLMN identifier to the PCRF device according to the serving gateway address change subscription request or PLMN change subscription request sent by the PCRF device and that the PCRF device sends the serving gateway address or PLMN identifier to the CTF device according to the serving gateway address change subscription request or PLMN change subscription request sent by the CTF device.

With reference to the tenth and eleventh implementation manners of the first aspect, in a twelfth implementation manner of the first aspect, if the charging system is an online charging system OCS, and the CTF device receives a reauthorization trigger condition returned by the OCS, where the trigger condition includes a serving gateway address change or PLMN change, the sending, by the CTF device, a serving gateway address change subscription request or PLMN change subscription request to the PCRF device, specifically includes: sending, by the CTF device, a serving gateway address change subscription request or PLMN change subscription request to the PCRF device according to the serving gateway address change or PLMN change included in the trigger condition.

With reference to the eleventh and twelfth implementation manners of the first aspect, in a thirteenth implementation manner of the first aspect, the charging method further includes: after the PCEF device detects that the serving gateway address or PLMN changes, sending, by the PCEF device, the changed serving gateway address or changed PLMN identifier to the PCRF device according to the serving gateway address change subscription request or PLMN change subscription request sent by the PCRF device; sending, by the PCRF device, the changed serving gateway address or changed PLMN identifier to the CTF device according to the serving gateway address change subscription request or PLMN change subscription request sent by the CTF device; and triggering, by the CTF device, reporting of the collected charging information about the application according to the serving gateway address change or PLMN change.

With reference to the ninth implementation manner of the first aspect, in a fourteenth implementation manner of the first aspect, if the CTF device is a traffic detection function TDF device, the TDF device receives the serving gateway address or PLMN identifier directly sent by the policy and charging enforcement function PCEF device and the changed serving gateway address sent after the serving gateway address or the changed PLMN identifier sent after the PLMN changes.

With reference to the first aspect and the first to fourteenth implementation manners of the first aspect, in a fifteenth implementation manner, if the CTF device is a TDF device, and the PCRF device further delivers a flow control policy carrying a gating operation to the PCEF device, the charging rule of the application further includes information about a downlink service data flow corresponding to the gating operation carried in the flow control policy; and the collecting, by the CTF device, charging information about the flow of the detected application, specifically includes: matching, by the CTF device, the flow of the detected application with the information about the downlink service data flow corresponding to the gating operation; and if the flow of the detected application does not match the information about the downlink service data flow corresponding to the gating operation, collecting, by the CTF device, the charging information about the flow of the application.

With reference to the first aspect and the first to fifteenth implementation manners of the first aspect, in a sixteenth implementation manner of the first aspect, if the CTF device is a TDF device, the CTF device receives the gating operation of the flow carried in the charging rule sent by the PCRF device and the information about the corresponding downlink service data flow; and if the CTF device performs the gating operation for the downlink service data flow, the collecting, by the CTF device, charging information about the flow of the detected application, specifically includes: if the gating operation allows the flow of the application to pass, collecting, by the CTF device, the charging information about the flow of the application.

With reference to the first aspect and the first to sixteenth implementation manners of the first aspect, in a seventeenth implementation manner of the first aspect, if the charging rule of the application carries flow description information of the application and indication information for instructing the CTF device to detect the application, the executing, by the CTF device, the charging rule of the application, and detecting, according to the application identifier, a flow of the application transmitted on one or more bearers, specifically includes: if the indication information instructs the CTF device to detect the application, detecting, by the CTF device, the flow of the application corresponding to the application identifier, where the flow is transmitted on one or more bearers; or if the indication information does not instruct the CTF device to detect the application, matching, by the CTF device, the flow description information of the application carried in the charging rule with the flow transmitted on one or more bearers, and using the flow that is transmitted on one or more bearers and matches the flow description information as the flow of the application detected by the CTF.

With reference to the first aspect and the first to seventeenth implementation manners of the first aspect, in an eighteenth implementation manner of the first aspect, the charging rule of the application carries the flow description information of the application; and the executing, by the CTF device, the charging rule of the application, and detecting, according to the application identifier, a flow of the application transmitted on one or more bearers, specifically includes: matching, by the CTF device, the flow description information of the application carried in the charging rule with the flow transmitted on one or more bearers, and using the flow that is transmitted on one or more bearers and matches the flow description information as the flow of the application detected by the CTF.

With reference to the first aspect and the first to eighteenth implementation manners of the first aspect, in a nineteenth implementation manner of the first aspect, the CTF device is a TDF device and the charging rule of the application further carries an identifier of a specific application; and the executing, by the CTF device, the charging rule of the application, and detecting, according to the application identifier, a flow of the application transmitted on one or more bearers, specifically includes: obtaining, by the CTF device according to the identifier of the specific application carried in the charging rule of the application, locally stored flow description information corresponding to the identifier of the specific application to match the flow, or matching, by the CTF device according to the identifier of the specific application carried in the charging rule of the application, other data flows than the flow of the application corresponding to the application identifier carried in the charging rule of the application.

With reference to the first aspect and the first to nineteenth implementation manners of the first aspect, in a twentieth implementation manner of the first aspect, the CTF device is a PCEF device and the charging rule of the application further carries an instruction about whether to establish the charging session of the application; and the sending, by the CTF device according to the charging rule parameters of the application, a charging session establishment request to a charging system, specifically includes: determining, by the CTF device according to the instruction about whether to establish the charging session of the application, whether to establish the charging session of the application; and if the instruction requires the CTF device to establish the charging session of the application, sending, by the CTF device according to the charging rule parameters of the application, a charging session establishment request to the charging system, and establishing the charging session of the application by using the charging session establishment request; or if the instruction requires the CTF device not to establish the charging session of the application, determining, by the CTF device according to the charging rule of the application, that the charging session of a bearer where the flow of the application is located is the charging session of the application.

With reference to the twentieth implementation manner of the first aspect, in a twenty-first implementation manner of the first aspect, the charging rule of the application further carries an instruction for binding the flow of the application to a specified bearer; and after the executing, by the CTF device, the charging rule of the application, and detecting, according to the application identifier, a flow of the application transmitted on one or more bearers, the method further includes: binding, by the CTF device, a template for the flow of the detected application to the specified bearer.

With reference to the twenty-first implementation manner of the first aspect, in a twenty-second implementation manner of the first aspect, the specified bearer is a bearer specified by the PCRF device by using the charging rule of the application or the specified bearer is a bearer selected by the CTF device; and the binding, by the CTF device, a template for the flow of the detected application to the specified bearer, specifically includes: binding, by the CTF device, a template for a downlink flow of the application to the bearer specified by the PCRF device or the bearer selected by the CTF device; and initiating, by the CTF device, an update of the bearer, and sending a template for an upstream flow of the application to a user client corresponding to the charging session of the application, so that the user client binds the template for the upstream flow of the application to the bearer specified by the PCRF device or the bearer selected by the CTF device.

According to a second aspect, an embodiment of the present invention provides a charging detection function CTF device, including: a first receiving unit, configured to receive a charging rule of an application from a policy and charging rules function PCRF device, where the charging rule of the application carries an application identifier and charging rule parameters of the application; a first processing unit, configured to execute the charging rule of the application, detect, according to the application identifier, a flow of the application transmitted on one or more bearers, send, according to the charging rule parameters of the application, a charging session establishment request to a charging system, establish a charging session of the application by using the charging session establishment request, and collect charging information about the flow of the detected application; and a first sending unit, configured to send the collected charging information about the flow of the application to the charging system by using the charging session of the application.

With reference to the second aspect, in a first implementation manner of the second aspect, the first processing unit is specifically configured to: when the CTF device detects a first application to be charged, send, according to the charging rule parameters, a charging session establishment request to the charging system, and establish the charging session of the application by using the charging session establishment request.

With reference to the first implementation manner of the second aspect, in a second implementation manner of the second aspect, after the charging session of the application is established, if the charging system is an online charging system, and the first processing unit detects that other applications to be charged start, and no quota meeting rating groups of the other applications is provided currently, the first sending unit requests quotas of the other applications from the charging system by using the established charging session of the application; or after the charging session of the application is established, if the first processing unit detects that the charged application ends, and the charging rule of the charging-ended application indicates reporting of application-layer charging information about the charging-ended application, the first sending unit sends the collected charging information about the charging-ended application to the charging system by using the established charging session of the application.

With reference to the second aspect and the first to second implementation manners of the second aspect, in a third implementation manner of the second aspect, when detecting that a last charged application ends, the first processing unit sends a charging session termination request to the charging system to terminate the established charging session of the application.

With reference to the second aspect and the first to third implementation manners of the second aspect, in a fourth implementation manner of the second aspect, the first sending unit sends an address of a serving gateway that the flow of the application passes through or an identifier of a public land mobile network PLMN to the charging system by using the charging session of the application, so that the charging system charges for the application corresponding to the application identifier according to the serving gateway address or PLMN identifier.

With reference to the fourth implementation manner of the second aspect, in a fifth implementation manner of the second aspect, the first receiving unit further receives the serving gateway address or PLMN identifier sent by the PCRF device, where the serving gateway address or PLMN identifier is sent by the PCEF device to the PCRF device.

With reference to the fifth implementation manner of the second aspect, in a sixth implementation manner of the second aspect, the first sending unit further sends a serving gateway address change subscription request or PLMN change subscription request to the PCRF device, whereupon the PCRF device sends the serving gateway address change subscription request or PLMN change subscription request to the PCEF device according to the serving gateway address change subscription request or PLMN change subscription request sent by the first sending unit, so that the PCEF device sends the serving gateway address or PLMN identifier to the PCRF device according to the serving gateway address change subscription request or PLMN change subscription request sent by the PCRF device and that the PCRF device sends the serving gateway address or PLMN identifier to the CTF device according to the serving gateway address change subscription request or PLMN change subscription request sent by the CTF device.

With reference to the sixth implementation manner of the second aspect, in a seventh implementation manner of the second aspect, after the PCEF device detects that the serving gateway address or PLMN changes, the PCEF device sends the changed serving gateway address or changed PLMN identifier to the PCRF device according to the serving gateway address change subscription request or PLMN change subscription request sent by the PCRF device; the PCRF device sends the changed serving gateway address or changed PLMN identifier to the first receiving unit according to the serving gateway address change subscription request or PLMN change subscription request sent by the first sending unit; and the first sending unit triggers reporting of the collected charging information about the application according to the serving gateway address change or PLMN change.

With reference to the seventh implementation manner of the second aspect, in an eighth implementation manner of the second aspect, the first receiving unit receives the serving gateway address or PLMN identifier directly sent by the policy and charging enforcement function PCEF device and the changed serving gateway address sent after the serving gateway address or the changed PLMN identifier sent after the PLMN changes.

With reference to the second aspect and the first to eighth implementation manners of the second aspect, in a ninth implementation manner of the second aspect, the charging rule of the application received by the first receiving unit further carries an identifier of a specific application; and the executing, by the first processing unit, the charging rule of the application, and detecting, according to the application identifier, a flow of the application transmitted on one or more bearers, specifically includes: obtaining, by the first processing unit according to the identifier of the specific application carried in the charging rule of the application, locally stored flow description information of the application corresponding to the identifier of the specific application to match the flow, or matching, by the first processing unit according to the identifier of the specific application carried in the charging rule of the application, other flows than the flow of the application corresponding to the application identifier carried in the charging rule of the application.

With reference to the ninth implementation manner of the second aspect, in a tenth implementation manner of the second aspect, the charging rule of the application further carries an instruction about whether to establish the charging session of the application; and the executing, by the first processing unit, the charging rule of the application, and detecting, according to the application identifier, the flow of the application transmitted on one or more bearers, specifically includes: determining, by the CTF device according to the instruction about whether to establish the charging session of the application, whether to establish the charging session of the application; and if the instruction requires the CTF device to establish the charging session of the application, sending, by the CTF device according to the charging rule parameters of the application, a charging session establishment request to the charging system, and establishing the charging session of the application by using the charging session establishment request; or if the instruction requires the CTF device not to establish the charging session of the application, determining, by the CTF device according to the charging rule of the application, that the charging session of a bearer where the flow of the application is located is the charging session of the application.

It can be seen from the technical solutions provided in the embodiments of the present invention that: after receiving the charging rule of the application, the CTF device in the embodiments of the present invention detects, according to the application identifier carried in the charging rule, the flow of the application transmitted on one or more bearers, and collects the charging information about the flow of the detected application, and the charging session of the application is established after the flow of the application is detected. Therefore, different from the prior art in which a charging session based on a granularity of a bearer can transmit only the charging information about the flow on this bear, in the technical solutions provided in the embodiments of the present invention, flows of applications on multiple bearers are detected, and free from the restrictions of the prior art, the technical solutions provided in the embodiments of the present invention can implement charging for an OTT application.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, a charging system refers to an online charging system OCS or an offline charging system OFCS, and a bearer refers to a PDP Context on a GPRS network or an IP-CAN Bearer on an EPC network.

In the embodiments of the present invention, an entity may also be expressed as a device. Entities may be independent devices or devices disposed in other devices, for example, a PCRF entity may be a PCRF device.

Figure 1:
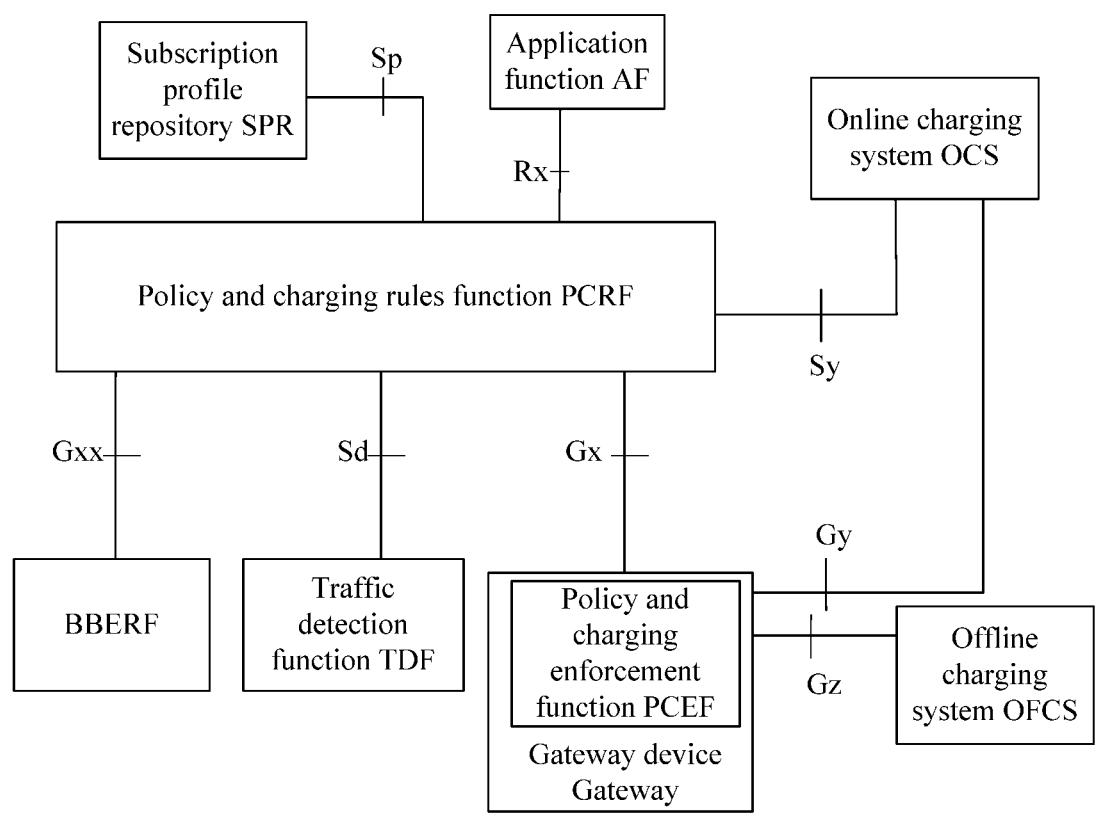
FIG. 1 is a structural diagram of a policy and charging control system provided in the prior art.
Figure 2:
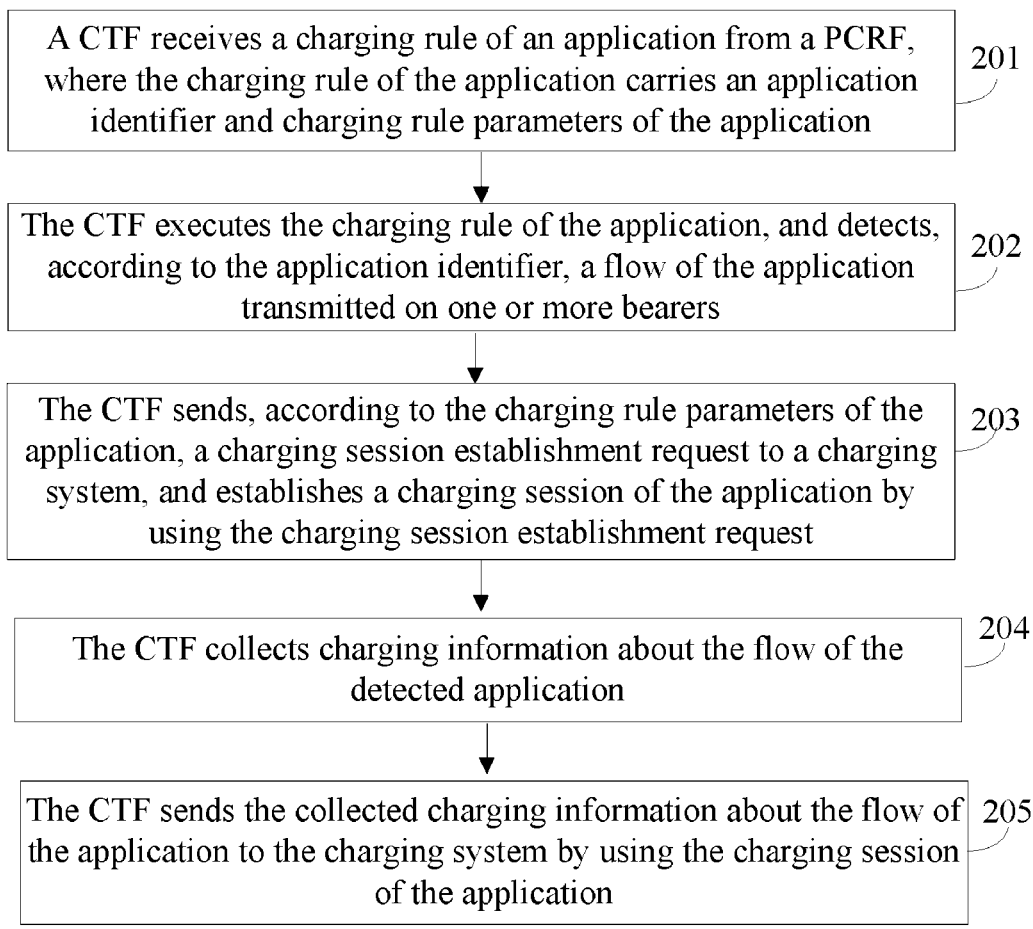
FIG. 2 is a flowchart of an application charging method according to an embodiment of the present invention.

First, an application charging method provided by an embodiment of the present invention is described. FIG. 2 shows a process of an application charging method according to an embodiment of the present invention, including:

201. A charging detection function CTF device receives a charging rule of an application from a policy and charging rules function PCRF device, where the charging rule of the application carries an application identifier and charging rule parameters of the application; the CTF device may be a policy and charging enforcement function PCEF device or a traffic detection function TDF device, and the charging rule parameters of the application may include a charging mode of the application, a rating group of the application, and a charging type, where the charging mode may be traffic-based charging or duration-based charging and the charging type may be online charging or offline charging; the charging rule of the application is targeted at a specific user, and further, an established charging session of the application is targeted at the user, and subsequently the collected charging information about the flow of the detected application is also targeted at the user and is charging information about the flow of the application corresponding to the application identifier.

202. The CTF device executes the charging rule of the application, and detects, according to the application identifier, a flow of the application transmitted on one or more bearers.

The flow of the application is a flow corresponding to the application; and the detecting the flow of the application according to the application identifier is identifying the flow of the application by using a DPI or DFI technology according to the application identifier. A DPI or DFI detection module is deployed on an endpoint of a bearer or away from an endpoint and detects the flow of the application by performing deep inspection on all flows transmitted on the bearer. The DPI or DFI module of the CTF device saves a feature code corresponding to the application identifier and detects the feature code corresponding to the application identifier in all packets of an IP-CAN Session of a user. A packet with the feature code corresponding to the application identifier is the application corresponding to the application identifier. Of course, another technology may also be used to detect, according to the application identifier, the flow of the application transmitted on one or more bearers.

Further, if the charging rule of the application further carries flow description information of the application (for example, a quintuple), the detecting the flow of the application according to the application identifier may also be matching the flow of the application according to the flow description information. In this case, the charging rule of the application may also carry indication information for instructing the CTF device to detect the application, and the executing, by the CTF device, the charging rule of the application, and detecting, according to the application identifier, a flow of the application transmitted on one or more bearers, may specifically include: if the indication information instructs the CTF device to detect the application, detecting, by the CTF device according to the application identifier, the flow of the application transmitted on one or more bearers, or if the indication information does not instruct the CTF device to detect the application, matching, by the CTF device, the flow description information of the application carried in the charging rule with the flow transmitted on one or more bearers, and using the flow that is transmitted on one or more bearers and matches the flow description information as the flow of the application detected by the CTF.

203. The CTF device sends, according to the charging rule parameters of the application, a charging session establishment request to a charging system, and establishes a charging session of the application by using the charging session establishment request.

Specifically, if the charging type carried in the charging rule parameters of the application is online charging, the CTF device sends an online charging session establishment request (CCR initial) to an online charging system, and requests a quota from the OCS according to the rating group of the application carried in the charging rule parameters; if the charging type carried in the charging rule parameters is offline charging, the CTF device sends an offline charging session establishment request (ACR Start) to an offline charging system.

Herein, the charging session of the application is a charging session independent of a bearer, and is a charging session dedicated to the application. The charging session of the application does not end when a bearer in the IP-CAN Session ends. The charging session dedicated to the application may be shared by multiple applications.

Alternatively, in another implementation manner, if the CTF device is a PCEF device, the charging session of the application may also be a charging session of a default bearer, and the charging session of the default bearer may report the charging information about the flow of the application transmitted on one or more bearers. In this case, if the CTF device has established the charging session of the default bearer with the charging system, the CTF device reuses the charging session; or otherwise, the CTF device sends a charging session establishment request to the charging system to reestablish a charging session. On the GPRS network, the default bearer is a primary PDP Context; on the EPC network, the default bearer is a default IP-CAN bearer Default IP-CAN Bearer.

204. The CTF device collects charging information about the flow of the detected application.

205. The CTF device sends the collected charging information about the flow of the application to the charging system by using the charging session of the application.

It can be seen from the technical solution provided in the embodiment of the present invention that: after receiving the charging rule of the application, the CTF device in the embodiment of the present invention detects, according to the application identifier carried in the charging rule, the flow of the application transmitted on one or more bearers, and collects the charging information about the flow of the detected application, and the charging session of the application is established after the flow of the application is detected. Therefore, different from the prior art in which a charging session based on a granularity of a bearer can transmit only the charging information about the flow on this bear, in the technical solution provided in the embodiment of the present invention, flows of applications on multiple bearers are detected, and free from the restrictions of the prior art, the technical solution provided in the embodiment of the present invention can implement charging for an OTT application. In the embodiment of the present invention, the sending, by the CTF device according to the charging rule parameters of the application, a charging session establishment request to the charging system, and establishing a charging session of the application by using the charging session establishment request, may specifically include: when the CTF device detects a first application to be charged, sending, by the CTF device according to the charging rule parameters, a charging session establishment request to the charging system, and establishing the charging session of the application by using the charging session establishment request. Herein, the detecting refers to first detecting a flow of the application after the charging rule of the application is executed.

According to the solution disclosed in the embodiment of the present invention, triggering establishment of a charging session of an application when a first application to be charged is detected makes establishment of the charging session of the application different from the prior art in which a charging session needs to be bound to a bearer, that is, in the prior art, a charging session is established when a bearer is established, whereas in the embodiment of the present invention, establishment of a charging session of an application is triggered when an application is available, which may reduce the burden of many charging sessions on the charging system and the CTF device when no application is available.

Specifically, the detecting, by the CTF device, a first application to be charged, may include: detecting, by the CTF device according to the application identifier, the flow of the application corresponding to the application identifier, and determining, according to the charging rule of the application, that the charging information about the detected application needs to be collected and reported, and if no charging session of the application exists currently, determining, by the CTF device, that the detected application is the first application to be charged.

In the embodiment of the present invention, after the charging session of the application is established, the method may further include the following two cases:

first case: if the charging system is an online charging system, when the CTF device detects that other applications to be charged start, and no quota meeting rating groups of the other applications is provided currently, the CTF device requests quotas of the other applications from the charging system by using the established charging session of the application; or second case: if the CTF device detects that the charged application ends, and the charging rule of the charging-ended application indicates reporting of application-layer charging information about the charging-ended application, the CTF device sends the collected charging information about the charging-ended application to the charging system by using the established charging session of the application.

In the embodiment of the present invention, the detecting, by the CTF device, that other applications to be charged start, may be: after the CTF device receives charging rules of the other applications from the PCRF device, executing, by the CTF device, the charging rules of the other applications, and detecting that the applications start to be used.

According to the embodiment of the present invention, when detecting that a last charged application ends, the CTF device sends a charging session termination request to the charging system to terminate the established charging session of the application.

Specifically, in the embodiment of the present invention, the detecting, by the CTF device, that a last charged application ends, may specifically include: if the application corresponding to the application identifier ends and no other applications are collecting or reporting charging information currently, or the charging rule of the application corresponding to the application identifier is updated or deleted, resulting in no need to perform charging for the application and no other applications are collecting or reporting charging information currently, determining, by the CTF device, that the detected last charged application ends.

Further, if the IP connectivity access network session IP Connectivity Access Network Session IP-CAN session does not end, the charging session termination request may further include an indication for indicating that charging for the last application ends but the IP-CAN session does not end;

and if the IP-CAN session ends, the charging session termination request includes an indication for indicating that the IP-CAN session ends.

Figure 3:
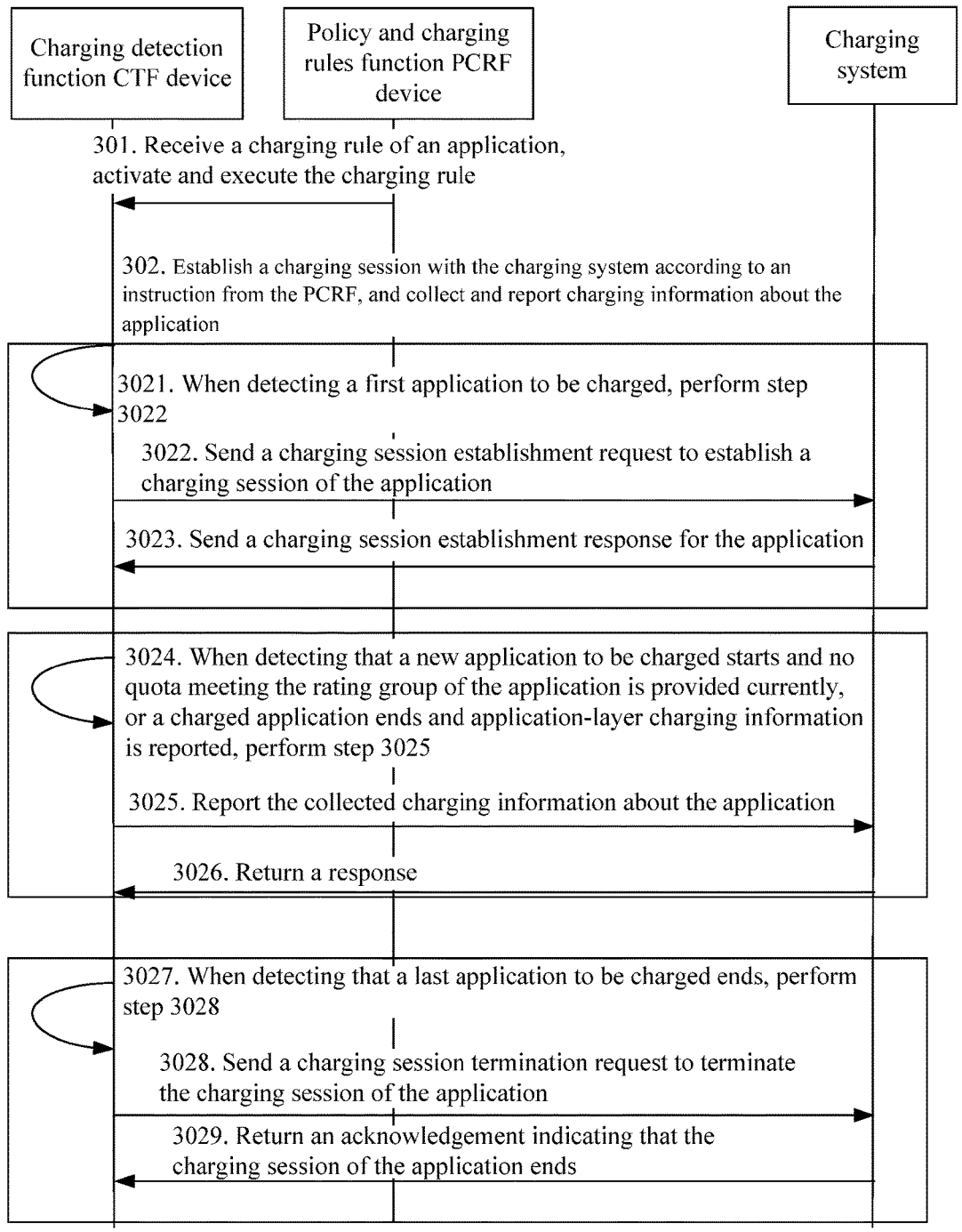
FIG. 3 is a flowchart of an application charging method according to another embodiment of the present invention.

FIG. 3 shows a process of an application charging method according to an embodiment of the present invention, including:

301. A PCRF device delivers a charging rule of an application to a CTF device, where the charging rule of the application instructs the CTF device to detect the application and collect and report charging information about the application; the CTF device may be a PCEF device or a TDF device, and specifically the PCRF device may determine, according to a configuration provided by an operator, whether the PCEF or TDF is used as a node for triggering application charging.

A charging policy of the application may include the following parameters: an application identifier Application ID and charging rule parameters of the application, where the charging rule parameters of the application may include at least one of the following: a rating group Rating Group, a charging mode, and a charging type that are corresponding to the application.

It should be noted that the PCRF device may deliver charging rules of applications for other applications, and modify or delete the delivered charging rules of the applications in subsequent steps.

In the embodiment of the present invention, an application may be a detecting unit of any granularity. It may correspond to a specific service provided by a service provider, a service type, or even a service group formed by a group of irrelevant services, for example, an application in the embodiment of the present invention may be a peer to peer (Peer to Peer, P2P) service or a specific P2P application such as eDonkey or all flows except a P2P flow.

302. After receiving the charging rule of the application from the PCRF device, the CTF device establishes a charging session of the application with a charging system according to the instruction provided by the PCRF device, collects and reports charging information about the application. The specific implementation process includes following steps 3021 to 3029:

3021. After receiving the charging rule of the application from the PCRF device, the CTF device detects the application according to the application identifier, and performs step 3022 after detecting a first application App.

A specific method for detecting the first App to be charged is as follows: according to the application identifier Application ID carried in the charging rule of the application from the PCRF device, the CTF device detects, with its DPI or DFI capability, a packet flow (traffic) of the application in the packet flows passing through the CTF device, and after detecting the first application, if the CTF device determines, according to the charging rule of the application from the PCRF device, that the charging information about the application needs to be collected and reported, the CTF device determines that the application is the first application App to be charged; and if the CTF device determines, according to the charging rule of the application from the PCRF device, that the charging information about the application does not need to be collected and reported, the CTF device continues to detect another application indicated by the PCRF device, until the CTF device detects an application and if determining, according to the charging rule of the application from the PCRF device, that the charging information about the application needs to be collected and reported, the CTF device determines that the application is the first application App to be charged.

The determining, by the CTF device according to the charging rule of the application from the PCRF device, that the charging information about the application needs to be collected and reported, may specifically include:

In the embodiment of the present invention, the method further includes: receiving, by the CTF device, charging rules of other applications from the PCRF device, and detecting, according to the charging rules of the other applications, flows of the other applications transmitted on one or more bearers; and the determining, according to the received charging rule of the application, that the charging information about the detected application needs to be collected and reported, may include the following two cases:

when the CTF device detects that the flow of the application can match charging rules of multiple applications, if a charging priority of the charging rule of the application corresponding to the application identifier is higher than charging priorities of the charging rules of the other applications and the charging rule of the application corresponding to the application identifier indicates a need of charging for the application, determining, by the CTF device, that the charging information about the application corresponding to the application identifier needs to be collected and reported; or the charging method further includes: receiving, by the CTF device, a charging rule of a flow from the PCRF device; and the determining, according to the received charging rule of the application, that the charging information about the detected application needs to be collected and reported, specifically includes: when the flow of the detected application can match the charging rule of the flow and the charging rule of the application at the same time, if a charging priority of the charging rule of the application is higher than a charging priority of the charging rule of the flow and charging priorities of the charging rules of the other applications and the charging rule of the application corresponding to the application identifier indicates a need of charging for the application, determining, by the CTF device, that the charging information about the application corresponding to the application identifier needs to be collected and reported.

3022. The CTF device sends a charging session establishment request to the charging system according to the charging rule parameters of the application, and establishes a charging session of the application by using the charging session establishment request.

Specifically, the CTF device sends a charging session establishment request to the charging system.

If the charging system is an online charging system OCS (Online Charging System), the CTF device sends a credit control request (CCR, Credit Control Request) command to the OCS, where a value of the credit control request type CC-Request-Type of the command is set to initial request INITIAL_REQUEST. This command carries a request for a quota corresponding to the rating group Rating Group of the first application to request a resource quota corresponding to the Rating Group from the OCS.

If the charging system is an offline charging system OFCS (Offline Charging System), the CTF device sends an accounting request (Accounting Request, ACR) command, where a value of the accounting record type Accounting-Record-Type of the command is set to start record START RECORD.

3023. After confirming that the charging session of the application is established, the charging system sends a charging session establishment response to the CTF device.

If the charging system is an OCS, the charging system also returns the quota granted to the CTF device.

3024. When the CTF device detects, according to the charging rule of the application from the PCRF device, that a new application to be charged starts and no quota meeting the Rating Group of the application is provided currently or a charged application ends and the charging rule of the charging-ended application indicates reporting of application-layer charging information about the charging-ended application, the CTF device performs step 3205.

In this case, the charging session of the application established for the application still exists, that is, the application that is charged previously does not end. In this case, if the user's location is updated or QoS of the application changes, the CTF device may perform step 3025 to report the collected charging information about the application.

3025. The CTF device reports the collected charging information about the application to the charging system;

Specifically, the charging information about the application may be reported by using the charging session established in step 3222.

If the charging system is an OCS, the CTF device sends a credit control request update CCR Update command to the OCS, where a value of the credit control request type CC-Request-Type of the command is set to update request UPDATE REQUEST. This command may carry the collected charging information about the application (an application for which charging is triggered); if a new charged application starts and no quota meeting the Rating Group of the application is provided currently, the command further carries a requested service unit RSU (Requested-Service-Unit) of a quota request corresponding to the Rating Group of the new application.

If the charging system is an OFCS, the CTF device sends an ACR command, where a value of the Accounting-Record-Type of the command is set to interim record INTERIM_RECORD. This command is used to report the collected charging information about the application.

3026. The charging system returns a response to the CTF device.

If the charging system is an OCS, the charging system also returns the quota granted to the CTF device.

3028. When detecting, according to the policy delivered by the PCRF device, that the last application to be charged ends, the CTF device performs step 3028.

The detecting that the last application to be charged ends specifically includes: the service ends (including interruption of the service by the user or interruption of the service due to other reasons) or the PCRF device removes the charging rule of the application, resulting in that no application is charged currently; or the PCRF device updates the charging rule of the application, resulting in that no application is charged currently.

3028. The CTF device sends a charging session termination request to the charging system to terminate the charging session of the application.

The terminated charging session is the charging session of the application established in step 3022.

If the charging system is an OCS, the CTF device sends a CCR Termination command to the OCS, where a value of the CC-Request-Type of the command is set to termination request TERMINATION_REQUEST. This command carries the collected charging information about the application;

If the charging system is an OFCS, the CTF device sends an ACR command, where a value of the Accounting-Record-Type of the command is set to stop record STOP RECORD. This command is used to report the collected charging information about the application;

In this case, if the IP-CAN session does not end, the charging session termination request may further include an indication for indicating that charging for the last application ends but the IP-CAN session does not end; if the IP-CAN session ends, the charging session termination request includes an indication for indicating that the IP-CAN session ends.

3029. The charging system returns an acknowledgement indicating that the charging session ends to the CTF device.

Specifically, the end of the charging session only means that no application needs to be charged currently, and does not mean that the IP-CAN Session is interrupted or charging is not performed for an application subsequently in the IP-CAN Session. During the existence of the IP-CAN Session, if the CTF device detects an application to be charged, which is indicated by the PCRF device, the CTF device performs steps 3021 to 3029 again. By using an IP-CAN Session, multiple charging sessions of applications may be established, that is, if a charging session of one application ends, a charging session of another application may be started in the same IP-CAN Session, but at the same time, only one charging session of an application exists.

Further, according to the embodiment of the present invention, the CTF device sends an address of a serving gateway that the flow of the application passes through or an identifier of a public land mobile network (public land mobile network, PLMN) to the charging system by using the charging session of the application, so that the charging system charges for the application corresponding to the application identifier according to the serving gateway address or PLMN identifier. The serving gateway Serving Gateway may be a serving GPRS support node (serving GPRS support node, SGSN) or a serving gateway (Serving Gateway, S-GW), and the charging may include determining a charge rate and/or allocating a quota.

Specifically, the charging session establishment request sent by the CTF device to the charging system may further carry information related to the application in a command-level Service-information parameter. Preferably, one parameter may be used to aggregate parameters related to the application. Herein, Application-information is used as an example. The Application-information parameter does not carry information related to a bearer. The information carried in Application-information may include the serving gateway Serving Gateway address or PLMN identifier or further include at least one of the following: quality of service QoS (Quality of Service) of the application, a user location, an access network type, and a user equipment type.

The CTF device may send the address of the serving gateway that the flow of the application passes through or the PLMN identifier to the charging system by using the charging session of the application in the following two manners:

First manner: According to the embodiment of the present invention, if the CTF device is a traffic detection function TDF device, the TDF device receives the serving gateway address or PLMN identifier sent by the PCRF device, where the serving gateway address or PLMN identifier is sent by the PCEF device to the PCRF device.

Further, the CTF device sends a serving gateway address change subscription request or PLMN change subscription request to the PCRF device, whereupon the PCRF device sends the serving gateway address change subscription request or PLMN change subscription request to the PCEF device according to the serving gateway address change subscription request or PLMN change subscription request sent by the CTF device, so that the PCEF device sends the serving gateway address or PLMN identifier to the PCRF according to the serving gateway address change subscription request or PLMN change subscription request sent by the PCRF device and that the PCRF device sends the serving gateway address or PLMN identifier to the CTF device according to the serving gateway address change subscription request or PLMN change subscription request sent by the CTF device. The PLMN change refers to the change of a mobile country code (mobile country code, MCC) or mobile network code (mobile network code, MNC). Further, according to the embodiment of the present invention, if the charging system is an online charging system OCS, and the CTF device receives a reauthorization trigger condition returned by the OCS, where the trigger condition includes a serving gateway address change or PLMN change, the method may further include: sending, by the CTF device according to the trigger condition, a serving gateway address change subscription request or PLMN change subscription request to the PCRF device, and sending, by the PCRF device, the serving gateway address change subscription request or PLMN change subscription request to the PCEF device according to the serving gateway address change subscription request or PLMN change subscription request sent by the CTF device.

Further, after the PCEF device detects that the serving gateway address or PLMN changes, the PCEF device sends the changed serving gateway address or changed PLMN identifier to the PCRF device according to the serving gateway address change subscription request or PLMN change subscription request sent by the PCRF device; the PCRF device sends the changed serving gateway address or changed PLMN identifier to the CTF device according to the serving gateway address change subscription request or PLMN change subscription request sent by the CTF device; and the CTF device triggers reporting of the collected charging information about the application according to the serving gateway address change or PLMN change.

Second manner: According to the embodiment of the present invention, if the CTF device is a traffic detection function TDF device, the CTF device may obtain the serving gateway address in the following manner: the TDF device receives the serving gateway address or PLMN identifier directly sent by the PCEF device and the changed serving gateway address sent after the serving gateway address or the changed PLMN identifier sent after the PLMN changes. The serving gateway address or PLMN identifier directly sent by the PCEF device is sent by the PCEF device to the TDF device through the Gi/SGi interface between the PCEF device and the TDF device. Specifically, in the embodiment of the present invention, the Gi interface between the PCEF device and the TDF device may be extended and the Diameter or GTP protocol may be added, so that the PCEF device can send one or more of the following to the TDF device when a first bearer is established: a user location, an access network type, a Serving Gateway address, a user equipment type, and a PLMN identifier, and the PCEF device sends the changed information to the TDF device after detecting that any one of the user location, the access network type, the Serving Gateway address, the user equipment type, and the PLMN identifier changes.

Figure 4:
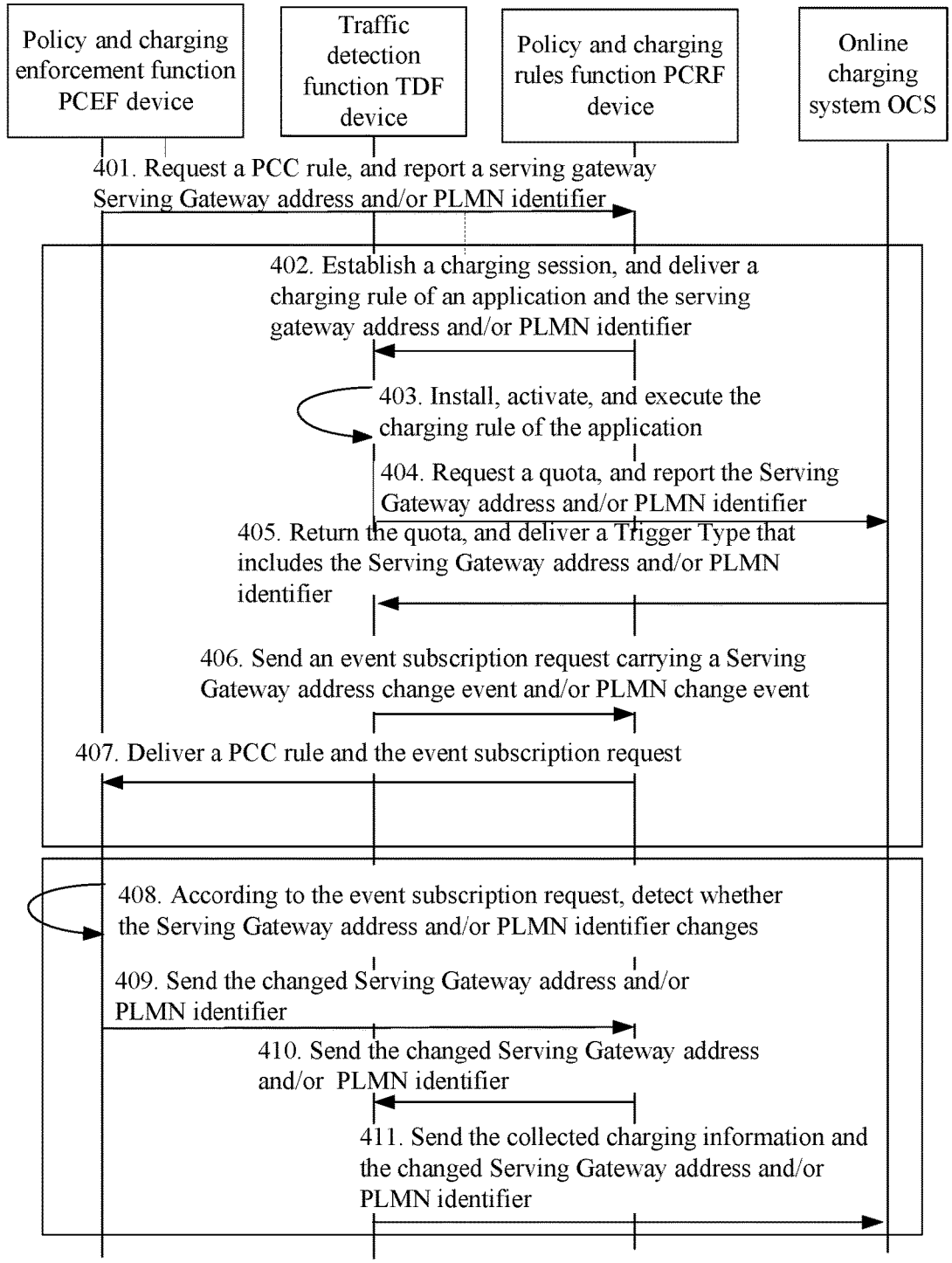
FIG. 4 is a flowchart of a method for a CTF device to subscribe to serving gateway address change according to another embodiment of the present invention.

For the first manner, reference may be made to the embodiment shown in FIG. 4. The embodiment shown in FIG. 4 discloses a specific implementation process in which the CTF device subscribes to a notification of the serving gateway address change from the PCRF device to obtain the changed serving gateway address, including the following steps:

401. A PCEF device requests a policy and charging control rule PCC Rule (Policy and Charging Control Rule) from a PCRF device, and reports a serving gateway Serving Gateway address and/or PLMN identifier to the PCRF device.

402. The PCRF device establishes a charging session with a TDF device, and delivers a charging rule of an application and the Serving Gateway address and/or PLMN identifier to the TDF device by using the charging session.

403. The TDF device installs, activates, and executes the charging rule of the application; if the charging system is an OCS, the TDF device performs steps 404 and 405 and then performs step 406; if the charging system is an OFCS, the TDF device directly performs step 406.

404. The TDF device requests a quota from the OCS, and reports the serving gateway address and/or PLMN identifier.

405. The OCS returns the allocated quota to the TDF device. The returned message may further carry a trigger type Trigger Type, where the Trigger Type includes the serving gateway address and/or PLMN identifier.

406. The TDF device sends an event subscription request to the PCRF device, where the event subscription request carries a Serving Gateway address change event and/or PLMN change event and is used to instruct the PCRF device to deliver the changed information to the TDF device when either one of the serving gateway address and PLMN identifier changes.

407. The PCRF device delivers the policy and charging control rule PCC Rule and the event subscription request to the PCEF device, where the event subscription request includes the Serving Gateway address change event and/or PLMN change event and is used to instruct the PCEF device to report the changed Serving Gateway address and/or PLMN identifier to the PCRF device when either one of the Serving Gateway address and PLMN identifier changes.

408. According to the event subscription request sent by the PCRF device, the PCEF device detects whether either one of the Serving Gateway address and PLMN identifier changes.

409. When the Serving Gateway address and/or PLMN identifier changes, the PCEF device sends the changed Serving Gateway address and/or PLMN identifier to the PCRF device.

410. The PCRF device sends the changed Serving Gateway address and/or PLMN identifier to the TDF device, where the changed Serving Gateway address and/or PLMN identifier is delivered by reinstalling the charging rule of the application by the TDF device.

411. According to the changed Serving Gateway address or PLMN identifier, the TDF device triggers sending of the collected charging information and the changed Serving Gateway address and/or PLMN identifier to the charging system so that the charging system performs charging.

After receiving the subscription request sent by the TDF device, the PCRF device delivers, according to the subscription request of the TDF device, an event subscription request corresponding to any event in the Serving Gateway address or PLMN identifier to the PCEF device, so that the PCEF device reports the changed information to the PCRF device when any of the foregoing information changes. The PCRF device updates the charging policies of all applications that delivered to the TDF device, so as to deliver, to the TDF device, the changed new information reported by the PCEF device. Specifically, if the charging system is an OCS, the TDF device determines, according to the Trigger Type returned by the OCS, the event to which the TDF device subscribes from the PCRF device. The event subscribed to by the TDF device from the PCRF device may be carried in a message in response to an installation message of the charging rule of the application, or the TDF device subscribes to the event from the PCRF device by using a CCR command after the charging rule of the application is installed and the Trigger Type returned by the OCS is received subsequently.

If the TDF device receives the updated charging rule of the application from the PCRF device and the charging rule of the application carries a serving gateway address change event or PLMN change event and the changed serving gateway address or PLMN identifier, the CTF device triggers sending of the collected charging information and the changed information to the charging system.

In the embodiment of the present invention, the TDF device reports the Serving Gateway address or PLMN identifier to the charging system by using a charging request so that the charging system implements charging more accurately. Specifically, the charging system may determine whether the user is roaming and determine the roaming location according to the Serving Gateway address so as to implement charging in a roaming scenario, and may determine its accessed PLMN network according to the PLMN identifier, and further determine a charge rate and record and provide usage information about the operator of the PLMN for subsequent settlement. Therefore, the factors of the charging reference for the charging system are more accurate and the accuracy of the charging is higher.

Further, according to the embodiment of the present invention, in order to avoid repeated charging, repeated flow information may be specifically removed during corresponding charging in the following two manners:

First manner: If the CTF device is a TDF device, the charging rule of the application may further include a flow control policy sent by the PCRF device to the PCEF device, and the flow control policy may carry information about a downlink service data flow corresponding to the gating operation; and the collecting, by the CTF device, charging information about the flow of the detected application, may specifically include: matching, by the CTF device, the flow of the detected application with the information about the downlink service data flow corresponding to the gating operation; and if the flow of the detected application does not match the information about the downlink service data flow corresponding to the gating operation, collecting, by the CTF device, the charging information about the flow of the application; or if the flow of the detected application matches the information about the downlink service data flow corresponding to the gating operation, not collecting, by the CTF device, the charging information about the flow of the application.

Second manner: If the CTF device is a TDF device, the CTF device receives the gating operation of the flow carried in the charging rule delivered by the PCRF device and the information about the corresponding downlink service data flow; and if the CTF device performs the gating operation for the downlink service data flow, the collecting, by the CTF device, charging information about the flow of the detected application, specifically includes: if the gating operation allows the flow of the application to pass, collecting, by the CTF device, the charging information about the flow of the application; or if the gating operation does not allow the flow of the application to pass, not collecting, by the CTF device, the charging information about the flow of the application.

In the second manner, if the PCRF device delivers the flow control policy to the PCEF device and the PCRF device determines that the TDF device charges for the application, the control policy delivered by the PCRF device to the PCEF device at least does not include the operation for downlink flows or does not include any operation. In this case, if the gating operation for a flow is required, the PCRF device delivers the gating operation for the flow to the TDF device separately and the TDF device completes the gating operation. Preferably, the PCRF device delivers a new control policy including the gating operation of the flow that requires the operation. The specific methods corresponding to the second manner are as follows:

1) The flow that requires the gating operation is used as a special application and delivered parameters indicate the identifier of the special application and corresponding operation. According to the identifier of the special application and configuration information of the TDF device, the TDF device determines a template for the flow that requires the operation. Of course, in this case, the TDF device needs to configure flow template information locally according to the identifier of the special application, match the flow according to the flow template, and perform the.

2) The flow that requires the is used as a special application and delivered parameters indicate the ID of the special application, SDF information corresponding to the application ID, and the operation. According to the SDF information, the TDF device determines the TFT of the flow that requires the, matches the flow according to the TFT, and performs the.

In the foregoing several manners, in order not to cause a conflict when the TDF device performs the gating operation for the flow and executes the charging rule of the application, the priority of the charging rule of the application may be carried in the charging rule of the application to indicate whether the TDF device performs the gating operation or executes the charging rule of the application when a packet can match the of the flow and charging rule of the application at the same time.

If the CTF device is a TDF device and the PCRF device knows in advance applications corresponding to which flows are to be charged or knows in advance flow description information (for example, an IP quintuple) of the application, the flow description information of the application may be carried in a charging rule of an application, for example, an ADC Rule. After receiving the ADC Rule, the TDF device makes statistics of the flows corresponding to the flow description to implement charging for the application. In this case, if the PCRF device still needs to ensure QoS of the flow, the PCRF device still delivers the PCC rule of the flow to the PCEF device, that is, the PCC rule of the flow is executed on the PCEF device and the charging is performed on the TDF device.

Further, in order to enable the TDF device to distinguish, after receiving the charging rule of the application from the PCRF device, which mode is used for charging, that is, enable the TDF device to determine which mode is based on the DPI/DFI technology to detect the application and perform charging and which mode performs charging based on flow matching, the TDF device can determine which charging mode is to be used in the following manners:

1) The charging rule of the application carries the flow description information of the application and indication information for instructing the CTF device to detect the application; the CTF device executes the charging rule of the application; and if the indication information instructs the CTF device to detect the application, the CTF device detects, according to the application identifier, the flow of the application corresponding to the application identifier, where the flow is transmitted on one or more bearers; or if the indication information does not instruct the CTF device to detect the application, the CTF device matches the flow description information of the application carried in the charging rule with the flow transmitted on one or more bearers, and uses the flow that is transmitted on one or more bearers and matches the flow description information as the flow of the application detected by the CTF.

2) If the charging rule of the application carries the flow description information of the application, the CTF device matches the flow description information of the application carried in the charging rule with the flow transmitted on one or more bearers, and uses the flow that is transmitted on one or more bearers and matches the flow description information as the flow of the application detected by the CTF.

Further, the CTF device is a TDF device and the charging rule of the application carries an identifier of a specific application; and the executing, by the CTF device, the charging rule of the application, and detecting, according to the application identifier, a flow of the application transmitted on one or more bearers, specifically includes: obtaining, by the CTF device according to the identifier of the specific application carried in the charging rule of the application, locally stored flow description information of the application corresponding to the identifier of the specific application to match the flow, or matching, by the CTF device according to the identifier of the specific application carried in the charging rule of the application, other data flows than the flow of the application corresponding to the application identifier carried in the charging rule of the application.

The identifier of the specific application is configured on the PCRF device and TDF device in advance. After receiving the identifier of the application, the TDF device does not perform deep inspection such as DPI or DFI.

Further, according to the embodiment of the present invention, if the CTF device is a PCEF device and the charging rule of the application further carries an instruction about whether to establish the charging session of the application, the CTF device determines, according to the instruction about whether to establish the charging session of the application, whether to establish the charging session of the application; and if the instruction requires the CTF device to establish the charging session of the application, the CTF device sends, according to the charging rule parameters of the application, a charging session establishment request to the charging system, and establishes the charging session of the application by using the charging session establishment request; or if the instruction requires the CTF device not to establish the charging session of the application, the CTF device determines, according to the charging rule of the application, that the charging session of the bearer where the flow of the application is located is the charging session of the application. Herein, the charging session on the bearer collects and reports only the charging information about the flow of the application transmitted on the bearer, and does not collect or report the charging information about the flow of the application transmitted on other bearers.

Specifically, the PCRF device may deliver an indication parameter for instructing the PCEF device whether to establish a charging session of an application, for example: the App-Level-Session parameter whose value is Yes or No. The indication parameter is used to instruct the PCEF device whether to establish a charging session of an application. If the parameter is No, the PCEF device does not need to establish a charging session dedicated to the application for the application and in this case, the application may be charged in the charging session on an existing bearer; if the parameter is Yes, the PCEF device establishes a dedicated charging session for the application. For the specific method of establishing a charging session for an application, reference may be made to steps 3021 to 3029 in the foregoing embodiment.

Further, according to the embodiment of the present invention, the charging rule of the application further carries an instruction for binding the flow of the application to a specified bearer; and after the executing, by the CTF device, the charging rule of the application, and detecting, according to the application identifier, a flow of the application transmitted on one or more bearers, the method further includes: binding, by the CTF device, a template for the flow of the detected application to the specified bearer.

The specified bearer is a bearer specified by the PCRF device by using the charging rule of the application or the specified bearer is a bearer selected by the CTF device; and the binding, by the CTF device, a template for the flow of the detected application to the specified bearer, specifically includes: binding, by the CTF device, a template for a downlink flow of the application to the bearer specified by the PCRF device or the bearer selected by the CTF device; and initiating, by the CTF device, an update of the bearer, and sending a template for an upstream flow of the application to a user client corresponding to the charging session of the application, so that the user client binds the template for the upstream flow of the application to the bearer specified by the PCRF device or the bearer selected by the CTF device.

According to the technical solution provided in the embodiment of the present invention, in the embodiment of the present invention, the PCRF device is used to instruct the PCEF device to perform determination and initiate bearer modification when the PCEF device detects an application, so that the application is bound to a bearer, that is, the charging mode of the existing bearer may be used to perform charging. In addition, in order to avoid frequent modification of a bearer, the PCRF device instructs the PCEF device whether to establish a dedicated charging session of the application. A dedicated charging session of the application may be established to reduce waste of resources in maintenance of the PCEF device and in charging sessions of applications established between charging systems. This is convenient for application charging.

Figure 5:
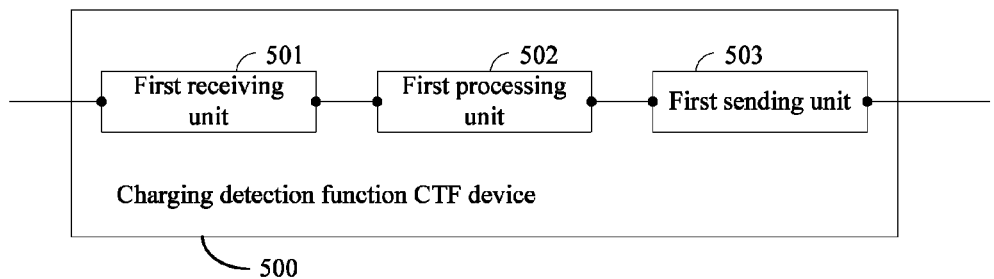
FIG. 5 is a structural diagram of a charging detection function CTF device according to an embodiment of the present invention.

The following describes a charging detection function CTF device provided in an embodiment of the present invention. FIG. 5 describes a charging detection function CTF device 500 according to an embodiment of the present invention, including: a first receiving unit 501, a first processing unit 502, and a first sending unit 503.

The first receiving unit 501 is configured to receive a charging rule of an application from a policy and charging rules function PCRF device, where the charging rule of the application carries an application identifier and charging rule parameters of the application.

The first processing unit 502 is configured to execute the charging rule of the application, detect, according to the application identifier, a flow of the application transmitted on one or more bearers, send, according to the charging rule parameters of the application, a charging session establishment request to a charging system, establish a charging session of the application by using the charging session establishment request, and collect charging information about the flow of the detected application.

The first sending unit 503 is configured to send the collected charging information about the flow of the application to the charging system by using the charging session of the application.

The charging session of the application herein is a charging session independent of a bearer, and is a charging session dedicated to the application. The charging session dedicated to the application may be shared by multiple applications.

Alternatively, if the CTF device is a PCEF device, the charging session of the application may also be a charging session of a default bearer, and the charging session of the default bearer may report the charging information about the flow of the application transmitted on one or more bearers. In this case, if the CTF device has established the charging session of the default bearer with the charging system, the CTF device reuses the charging session; or otherwise, the CTF device sends a charging session establishment request to the charging system.

It can be seen from the technical solution provided in the embodiment of the present invention that: after receiving the charging rule of the application, the CTF device in the embodiment of the present invention detects, according to the application identifier carried in the charging rule, the flow of the application transmitted on one or more bearers, and collects the charging information about the flow of the detected application, and the charging session of the application is established after the flow of the application is detected. Therefore, different from the prior art in which a charging session based on a granularity of a bearer can transmit only the charging information about the flow on this bear, in the technical solution provided in the embodiment of the present invention, flows of applications on multiple bearers are detected, and free from the restrictions of the prior art, the technical solution provided in the embodiment of the present invention can implement charging for an OTT application.

The first processing unit 502 is specifically configured to: when the CTF device detects a first application to be charged, send, according to the charging rule parameters, a charging session establishment request to the charging system, and establish the charging session of the application by using the charging session establishment request; or the first processing unit 502 is specifically configured to: detect, by the CTF device according to the application identifier, the flow of the application corresponding to the application identifier, and determine, according to the charging rule of the application, that the charging information about the detected application needs to be collected and reported, and if no charging session of the application exists currently, determine. by the CTF device, that the detected application is the first application to be charged.

The first receiving unit 501 further receives charging rules of other applications from the PCRF device.

The first processing unit 502 further detects, according to the charging rules of the other applications, flows of the other applications transmitted on one or more bearers; when the first processing unit 502 detects that the flow of the application matches the charging rules of multiple applications, if a charging priority of the charging rule of the application corresponding to the application identifier is higher than charging priorities of the charging rules of the other applications and the charging rule of the application corresponding to the application identifier indicates a need of charging for the application, the first processing unit 502 determines that the charging information about the application corresponding to the application identifier needs to be collected and reported; or the first receiving unit 501 receives a charging rule of a flow from the PCRF device; when the flow of the application detected by the first processing unit 502 matches the charging rule of the flow and charging rules of multiple applications, if a charging priority of the charging rule of the application corresponding to the application identifier is higher than a charging priority of the charging rule of the flow and charging priorities of the charging rules of the other applications and the charging rule of the application corresponding to the application identifier indicates a need of charging for the application, the first processing unit 502 determines that the charging information about the application corresponding to the application identifier needs to be collected and reported.

After the charging session of the application is established, when the first processing unit 502 detects that other applications to be charged start, the first processing unit 502 collects the charging information about the applications to be charged and the first sending unit 503 sends the collected charging information about the applications to be charged by using the established charging session of the application; or after the charging session of the application is established, if the charging system is an online charging system, the first processing unit 502 detects that other applications start and no quota meeting rating groups of the applications is provided currently, the first sending unit 503 requests quotas of the applications from the charging system; or after the charging session of the application is established, if the first processing unit 502 detects that the charged application ends and the charging rule of the charging-ended application indicates reporting of application-layer charging information about the charging-ended application, the first sending unit 503 sends the collected charging information about the application to the charging system by using the established charging session of the application.

According to the embodiment of the present invention, when detecting that a last charged application ends, the first processing unit 502 sends a charging session termination request to the charging system to terminate the established charging session of the application.

The detecting, by the first processing unit 502, that a last charged application ends, specifically includes: if the application corresponding to the application identifier ends and no other applications are collecting or reporting charging information currently, or the charging rule of the application corresponding to the application identifier is updated or deleted, resulting in no need to perform charging for the application and no other applications are collecting or reporting charging information currently, determining, by the first processing unit, that the detected last charged application ends.

If the first processing unit 502 determines that an IP connectivity access network session IP-CAN session does not end when the CTF detects that the last charged application ends, the charging session termination request includes an indication for indicating that charging for the last application ends but the IP-CAN session does not end; if the first processing unit determines that the IP-CAN session ends, the charging session termination request includes an indication for indicating that the IP-CAN session ends.

According to the embodiment of the present invention, the first sending unit 503 may send an address of a serving gateway that the flow of the application passes through or an identifier of a public land mobile network PLMN to the charging system by using the charging session of the application, so that the charging system charges for the application corresponding to the application identifier according to the serving gateway address or PLMN identifier.

The first receiving unit 501 further receives the serving gateway address or PLMN identifier sent by the PCRF device, where the serving gateway address or PLMN identifier is sent by the PCEF device to the PCRF device.

The first sending unit 503 further sends a serving gateway address change subscription request or PLMN change subscription request to the PCRF device, whereupon the PCRF device sends the serving gateway address change subscription request or PLMN change subscription request to the PCEF device according to the serving gateway address change subscription request or PLMN change subscription request sent by the first sending unit 503, so that the PCEF device sends the serving gateway address or PLMN identifier to the PCRF device according to the serving gateway address change subscription request or PLMN change subscription request sent by the PCRF device and that the PCRF device sends the serving gateway address or PLMN identifier to the CTF device according to the serving gateway address change subscription request or PLMN change subscription request sent by the first sending unit 503.

If the charging system is an online charging system OCS, the first receiving unit 501 receives a reauthorization trigger condition returned by the OCS, where the trigger condition includes a serving gateway address change or PLMN change; and the sending, by the CTF device, a serving gateway address change subscription request or PLMN change subscription request to the PCRF device, specifically includes: sending, by the first sending unit 503, a serving gateway address change subscription request or PLMN change subscription request to the PCRF device according to the serving gateway address change or PLMN change included in the trigger condition.

After the PCEF device detects that the serving gateway address or PLMN changes, the PCEF device sends the changed serving gateway address or changed PLMN identifier to the PCRF device according to the serving gateway address change subscription request or PLMN change subscription request sent by the PCRF device; the PCRF device sends the changed serving gateway address or changed PLMN identifier to the first receiving unit 501 according to the serving gateway address change subscription request or PLMN change subscription request sent by the first sending unit 503; and the first sending unit 503 triggers reporting of the collected charging information about the application according to the serving gateway address change or PLMN change.

The first receiving unit 501 receives the serving gateway address or PLMN identifier directly sent by the policy and charging enforcement function PCEF device and the changed serving gateway address sent after the serving gateway address or the changed PLMN identifier sent after the PLMN changes.

If the CTF device is a TDF device, and the PCRF device further delivers a flow control policy carrying a gating operation to the PCEF device, the charging rule of the application further includes information about a downlink service data flow corresponding to the gating operation carried in the flow control policy; and the collecting, by the first processing unit 502, charging information about the flow of the detected application, specifically includes: matching, by the first processing unit 502, the flow of the detected application with the information about the downlink service data flow corresponding to the gating operation; and if the flow of the detected application does not match the information about the downlink service data flow corresponding to the gating operation, collecting, by the first processing unit 502, the charging information about the flow of the application.

When the first receiving unit 501 receives the gating operation of the flow carried in the charging rule sent by the PCRF device and the information about the corresponding downlink service data flow, if the first processing unit 502 performs the gating operation for the downlink service data flow, the collecting charging information about the flow of the detected application, specifically includes: if the gating operation allows the flow of the application to pass, collecting, by the first processing unit 502, the charging information about the flow of the application.

If the charging rule of the application carries flow description information of the application and indication information for instructing the CTF device to detect the application, the executing, by the first processing unit 502, the charging rule of the application, and detecting, according to the application identifier, a flow of the application transmitted on one or more bearers, specifically includes: if the indication information instructs the CTF device to detect the application, detecting, by the first processing unit 502, the flow of the application corresponding to the application identifier, where the flow is transmitted on one or more bearers; or otherwise, matching, by the first processing unit 502, the flow description information of the application carried in the charging rule with the flow transmitted on one or more bearers.

If the charging rule of the application carries the flow description information of the application, the executing, by the first processing unit 502, the charging rule of the application, and detecting, according to the application identifier, a flow of the application transmitted on one or more bearers, specifically includes: matching, by the first processing unit 502, the flow description information of the application carried in the charging rule with the flow transmitted on one or more bearers.

If the charging rule of the application received by the first receiving unit 501 carries an identifier of a specific application, the executing, by the first processing unit 502, the charging rule of the application, and detecting, according to the application identifier, a flow of the application transmitted on one or more bearers, specifically includes: obtaining, by the first processing unit 502 according to the identifier of the specific application carried in the charging rule of the application, locally stored flow description information of the application corresponding to the identifier of the specific application to match the flow, or matching, by the first processing unit 502 according to the identifier of the specific application carried in the charging rule of the application, other data flows than the flow of the application corresponding to the application identifier carried in the charging rule of the application.

In the embodiment of the present invention, if the CTF device is a PCEF device and the charging rule of the application further carries an instruction about whether to establish the charging session of the application, the sending, by the first processing unit 502 according to the charging rule parameters of the application, a charging session establishment request to a charging system, specifically includes: determining, by the CTF device according to the instruction about whether to establish the charging session of the application, whether to establish the charging session of the application; and if the instruction requires the CTF device to establish the charging session of the application, sending, by the CTF device according to the charging rule parameters of the application, a charging session establishment request to the charging system, and establishing the charging session of the application by using charging session establishment request; or if the instruction requires the CTF device not to establish the charging session of the application, determining, by the CTF device according to the charging rule of the application, that the charging session of a bearer where the flow of the application is located is the charging session of the application.

Further, if the charging rule of the application further carries an instruction for binding the flow of the application to a specified bearer, after the first processing unit 502 executes the charging rule of the application, and detects, according to the application identifier, the flow of the application transmitted on one or more bearers, the first processing unit 502 binds a template for the flow of the detected application to the specified bearer.

Further, if the specified bearer is a bearer specified by the PCRF device by using the charging rule of the application or the specified bearer is a bearer selected by the first processing unit 502, the binding, by the first processing unit 502, a template for the flow of the detected application to the specified bearer, specifically includes: binding, by the first processing unit 502, a template for a downlink flow of the application to the bearer specified by the PCRF device or the bearer selected by the first processing unit 502; and initiating, by the first processing unit 502, an update of the bearer, and sending a template for an upstream flow of the application to a user client corresponding to the charging session of the application, so that the user client binds the template for the upstream flow of the application to the bearer specified by the PCRF device or the bearer selected by the first processing unit 502.

An embodiment of the present invention further provides an application charging system. The application charging system provided in the embodiment of the present invention may include the charging detection function CTF device provided in the embodiments of the present invention.

Figure 6:
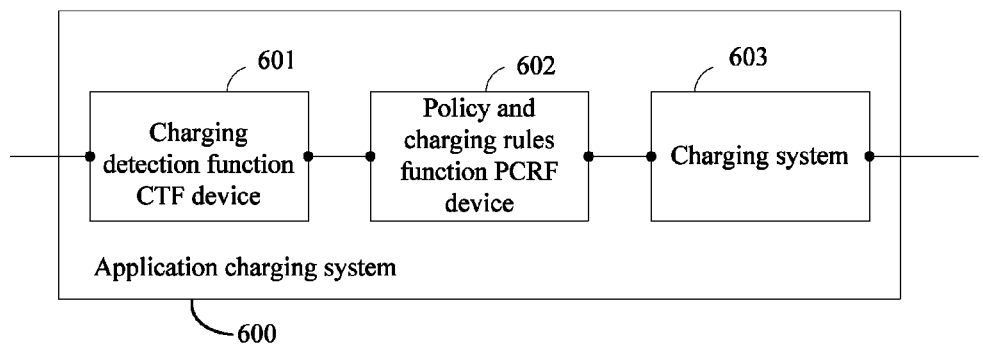
FIG. 6 is a structural diagram of an application charging system according to an embodiment of the present invention.

FIG. 6 shows an application charging system according to an embodiment of the present invention. The application charging system includes a charging detection function CTF device 701, a policy and charging rules function PCRF device 702, and a charging system 703.

The CTF device 701 is configured to receive a charging rule of an application from a policy and charging rules function PCRF device, where the charging rule of the application carries an application identifier and charging rule parameters of the application; execute the charging rule of the application, and detect, according to the application identifier, a flow of the application transmitted on one or more bearers; send, according to the charging rule parameters of the application, a charging session establishment request to a charging system, and establish a charging session of the application by using the charging session establishment request; and collect charging information about the flow of the detected application; and send the collected charging information about the flow of the application to the charging system by using the charging session of the application.

The PCRF device 702 is configured to deliver the charging rule of the application to the CTF device 701; and the charging system 703 is configured to receive the charging session establishment request sent by the CTF device 701, receive the collected charging information about the flow of the application from the CTF device 701, and further perform charging, so as to implement charging for the application.

It should be noted that in the embodiment of the present invention shown in FIG. 6, the CTF device may be a TDF device or a PCEF device. If the CTF device is a TDF device, the first processing unit may repeatedly process the flow of the charging information; the first processing unit may also subscribe to serving gateway address change or PLMN identifier change. For detailed processes of the processing executed by various devices, reference may be made to related descriptions in other embodiments of the present invention, and no repeated description is provided herein.

It can be seen from the technical solution provided in the embodiment of the present invention that: after receiving the charging rule of the application, the CTF device in the embodiment of the present invention detects, according to the application identifier carried in the charging rule, the flow of the application transmitted on one or more bearers, and collects the charging information about the flow of the detected application, and the charging session of the application is established after the flow of the application is detected. Therefore, different from the prior art in which a charging session based on a granularity of a bearer can transmit only the charging information about the flow on this bear, in the technical solution provided in the embodiment of the present invention, flows of applications on multiple bearers are detected, and free from the restrictions of the prior art, the technical solution provided in the embodiment of the present invention can implement charging for an OTT application.

Figure 7:
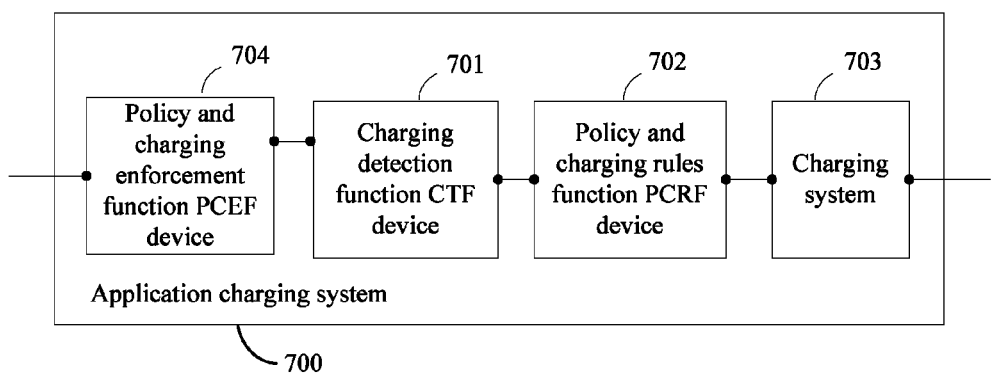
FIG. 7 is a structural diagram of an application charging system according to another embodiment of the present invention.

FIG. 7 shows an application charging system according to another embodiment of the present invention. The application charging system includes a charging detection function CTF device 701, a policy and charging rules function PCRF device 702, a policy and charging enforcement function PCEF device 704, and a charging system 703. In this embodiment, the CTF device may be a TDF device. Apart from the functions implemented in the embodiment shown in FIG. 6, the PCEF device in this embodiment may execute a PCC Rule but the TDF device triggers charging.

For the structures and specific processing of the CTF device, the PCEF device, the PCRF device, and the charging system described in this embodiment, reference may be made to related descriptions in other embodiments of the present invention, and no repeated description is provided herein.

Figure 8:
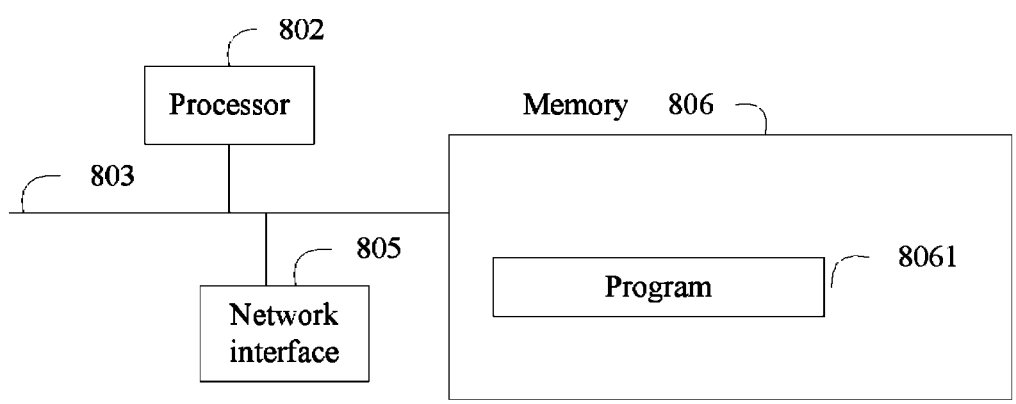
FIG. 8 is a structural diagram of a charging trigger function CTF device according to another embodiment of the present invention.

FIG. 8 shows a structure of a charging trigger function CTF device according to another embodiment of the present invention. The CTF device includes at least one processor 802 (for example, a CPU), at least one network interface 805 or another communication interface, a memory 806, and at least one communication bus 803 to implement connection and communication between these apparatuses. The processor 802 is configured to run an executable module in the memory 806, for example, a computer program. The memory 806 may include a high speed random access memory (RAM, Random Access Memory) or a non-volatile memory, for example, at least one disk memory. At least one network interface 805 (which may be wired or wireless) implements communication and connection between the system gateway and at least one another network element. The Internet, a wide area network, a local area network, or a metropolitan area network may be used.

In some implementation manners, the memory 806 stores a program 8061, which may be executed by the processor 802. The program includes: receiving, by a charging detection function CTF device, a charging rule of an application from a policy and charging rules function PCRF device, where the charging rule of the application carries an application identifier and charging rule parameters of the application; executing, by the CTF device, the charging rule of the application, and detecting, according to the application identifier, a flow of the application transmitted on one or more bearers; sending, by the CTF device according to the charging rule parameters of the application, a charging session establishment request to a charging system, and establishing a charging session of the application by using the charging session establishment request; collecting, by the CTF device, charging information about the flow of the detected application; and sending, by the CTF device, the collected charging information about the flow of the application to the charging system by using the charging session of the application.

It can be seen from the technical solutions provided in the embodiments of the present invention that: after receiving the charging rule of the application, the CTF device in the embodiment of the present invention detects, according to the application identifier carried in the charging rule, the flow of the application transmitted on one or more bearers, and collects the charging information about the flow of the detected application, and the charging session of the application is established after the flow of the application is detected. Therefore, different from the prior art in which a charging session based on a granularity of a bearer can transmit only the charging information about the flow on this bear, in the technical solution provided in the embodiment of the present invention, flows of applications on multiple bearers are detected, and free from the restrictions of the prior art, the technical solution provided in the embodiment of the present invention can implement charging for an OTT application.

The information exchange between different modules in the apparatus and the system and the execution processes are based on the same idea as the method embodiments of the present invention. Therefore, reference may be made to descriptions in the method embodiments of the present invention, and no repeated description is provided herein.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM, Read-Only Memory), or a random access memory (RAM, Random Access Memory) or the like.

Although the principle and implementation manners of the present invention are described with reference to specific embodiments, the descriptions of the embodiments are merely used to help understand the method and idea of the present invention. Meanwhile, a person of ordinary skill in the art may make variations to the specific implementation manners and application scope according to the idea of the present invention. In conclusion, the content of the specification shall not be construed as a limitation to the present invention.

What is claimed is:

1. An application charging method, comprising:
receiving, by a charging Trigger function (CTF) device, a charging rule of an application from a policy and charging rules function (PCRF) device, wherein the charging rule of the application carries an application identifier and an application charging rule parameter;
detecting, by the CTF device, according to the application identifier, a flow of the application transmitted on one or more bearers;
sending, by the CTF device according to the application charging rule parameter, a charging session establishment request to a charging system for establishing a charging session of the application;
collecting, by the CTF device, charging information about the flow of the application; and
sending, by the CTF device, the collected charging information to the charging system by using the charging session of the application.

2. The charging method according to claim 1, wherein the charging session of the application is a default bearer charging session, and the default bearer charging session is capable of reporting the charging information about the flow of the application transmitted on the one or more bearers.

3. The charging method according to claim 1, wherein:
the sending, by the CTF device according to the application charging rule parameter, the charging session establishment request to the charging system for establishing the charging session of the application comprises:
sending, by the CTF device according to the application charging rule parameter, the charging session establishment request to the charging system for establishing the charging session of the application by using the charging session establishment request when the CTF device detects a first application to be charged.

4. The charging method according to claim 3, wherein:
the detecting, by the CTF device, a first application to be charged, comprises:
detecting, by the CTF device according to the application identifier, the flow of the application corresponding to the application identifier;
determining, according to the charging rule of the application, that the charging information about the detected application needs to be collected and reported;
determining, by the CTF device, that the detected application is the first application to be charged if no charging session of the application currently exists.

5. The charging method according to claim 1, wherein:
the charging method further comprises:
receiving, by the CTF device, a second application charging rule from the PCRF device, and detecting, according to the second application charging rule, flows of the second application transmitted on the one or more bearers; and
determining, by the CTF device, that the charging information about the application with higher charging priority needs to be collected and reported when the CTF device detects that the flow of the application matches charging rules of multiple applications.

6. The charging method according to claim 2, wherein:
after the charging session of the application is established, the method further comprises:
requesting, by the CTF device, quotas of a second application from the charging system by using the established charging session of the application when the CTF device detects that the second application to be charged starts, and no quota meeting rating groups of the second application is provided.

7. The charging method according to claim 1, further comprising:
sending, by the CTF device, a charging session termination request to the charging system to terminate the established charging session of the application when the CTF device detects that a last charged application ends.

8. The charging method according to claim 7, wherein:
the detecting, by the CTF device, that the last charged application ends, comprises:
determining, by the CTF device, that the detected last charged application ends if the application corresponding to the application identifier ends and no other application is collecting or reporting charging information, or if the charging rule of the application corresponding to the application identifier is updated or deleted, resulting in no need to perform charging for the application and no other application is collecting or reporting charging information.

9. The charging method according to claim 7, wherein:
the CTF device detects that the last charged application ends,
the charging session termination request comprises an indication for indicating that charging for the last application ends but the IP-CAN session does not end if an IP connectivity access network session (IP-CAN) session does not end; and
the charging session termination request comprises an indication for indicating that the IP-CAN session ends if the IP-CAN session ends.

10. The charging method according to claim 1, wherein:
the CTF device sends an address of a serving gateway that the flow of the application passes through or an identifier of a public land mobile network (PLMN) to the charging system by using the charging session of the application, so that the charging system charges for the application corresponding to the application identifier according to the serving gateway address or PLMN identifier.

11. The charging method according to claim 10, wherein the CTF device is a traffic detection function TDF device, and the method further comprises:
receiving, by the TDF device, the serving gateway address or PLMN identifier sent by a policy and charging enforcement function (PCRF) device, wherein the serving gateway address or PLMN identifier is sent by the PCEF device to the PCRF device.

12. The charging method according to claim 11, wherein the method further comprises:
sending, by the CTF device, a serving gateway address change subscription request or PLMN change subscription request to the PCRF device, wherein the PCRF device sends the serving gateway address change subscription request or PLMN change subscription request to the PCEF device according to the serving gateway address change subscription request or PLMN change subscription request sent by the CTF device, so that the PCEF device sends the serving gateway address or PLMN identifier to the PCRF device according to the serving gateway address change subscription request or PLMN change subscription request sent by the PCRF device and that the PCRF device sends the serving gateway address or PLMN identifier to the CTF device according to the serving gateway address change subscription request or PLMN change subscription request sent by the CTF device.

13. The charging method according to claim 11, wherein:
the charging system is an online charging system (OCS), and the CTF device receives a reauthorization trigger condition returned by the OCS, wherein the reauthorization trigger condition comprises a serving gateway address change or PLMN change, the sending, by the CTF device, a serving gateway address change subscription request or PLMN change subscription request to the PCRF device, comprises:
sending, by the CTF device, a serving gateway address change subscription request or PLMN change subscription request to the PCRF device according to the serving gateway address change or PLMN change comprised in the reauthorization trigger condition.

14. The charging method according to claim 12, further comprising:
receiving, by the CTF device, a changed serving gateway address or changed PLMN identifier from the PCRF device; and
triggering, by the CTF device, reporting of the collected charging information about the application according to the serving gateway address change or PLMN change.

15. The charging method according to claim 10, wherein:
the CTF device is a traffic detection function (TDF) device, the TDF device receives the serving gateway address or PLMN identifier directly sent by a policy and charging enforcement function (PCEF) device and the changed serving gateway address sent after the serving gateway address changes or the changed PLMN identifier sent after the PLMN changes.

16. The charging method according to claim 1, wherein:
the charging rule of the application carries the flow description information of the application; and
the detecting, according to the application identifier, the flow of the application transmitted on the one or more bearers, comprises:
matching, by the CTF device, the flow description information of the application carried in the charging rule with the flow transmitted on the one or more bearers, and using the flow that is transmitted on the one or more bearers and matches the flow description information as the flow of the application detected by the CTF.

17. The charging method according to claim 1, wherein:
the CTF device is a traffic detection function (TDF) device and the charging rule of the application further carries a specific application identifier; and
the detecting, according to the specific application identifier, the flow of the application transmitted on the one or more bearers, comprises:
obtaining, by the CTF device according to the specific application identifier carried in the charging rule of the application, locally stored flow description information corresponding to the specific application identifier to match the flow, or matching, by the CTF device according to the specific application identifier carried in the charging rule of the application, other data flows than the flow of the application corresponding to the specific application identifier carried in the charging rule of the application.

18. A charging Trigger function (CTF) device, comprising:
at least one processor; and
a memory coupled to the processor, the memory including instructions executable by the at least one processor for:

receiving a charging rule of an application from a policy and charging rules function (PCRF) device, wherein the charging rule of the application carries an application identifier and an application charging rule parameter of the application;

detecting, according to the application identifier, a flow of the application transmitted on one or more bearers;

sending, according to the application charging rule parameter, a charging session establishment request to a charging system for establishing a charging session of the application;

collecting charging information about the flow of the application; and sending the collected charging information about the flow of the application to the charging system by using the charging session of the application.

* * * * *